Patented Apr. 16, 1946

2,398,485

UNITED STATES PATENT OFFICE 2,398,485

PURIFICATION OF DICARBOXYLIC ACIDS

Norman B. Wilson, Coulterville, Ill., assignor to Shell Development Company, San Francisco, Calif., a corporation of Delaware No Drawing. Application May 3, 1943,
Serial No. 485,547

12 Claims. (Cl. 252—56)

This invention relates to the purification of dicarboxylic acids having corrosion inhibiting properties, and more particularly is concerned with the removal of certain salts thereof which may form during their manufacture.

It is known that dicarboxylic acids having at least 16, and preferably 20 to 60 carbon atoms, are potent corrosion inhibitors for various metals and particularly for iron. Both pure acids, as well as mixtures of several different acids, may be used for corrosion inhibition.

When producing suitable dicarboxylic acids commercially, frequently certain impurities are introduced which are very harmful to the corrosion-inhibiting powers of the acids. I have discovered that metal salts, notably iron, nickel, copper, aluminum, magnesium, etc., salts which may be dispersed in the dicarboxylic acids in the course of their manufacture are particularly harmful. The elimination of these and certain other impurities which may be present greatly raises the anti-corrosive powers of the dicarboxylic acids, and also improves the demulsibility of lubricating oils containing them.

It is a purpose of this invention to purify corrosion-inhibiting dicarboxylic acids. It is another purpose to remove from various solutions of such dicarboxylic acids dispersed metal compounds which interfere with the usefulness of such solutions. More specific purposes are to remove from such solutions metal compounds which were introduced during manufacture and which interfere with the anti-corrosive powers of the dicarboxylic acids; or metal compounds which were introduced during use and which may cause emulsification or foaming, or both.

In order to eliminate these impurities, raw dicarboxylic acid is dissolved in a suitable high boiling solvent, and the solution is blown with an inert gas at a temperature above 100° C. and below the dehydration temperature of the acid. A precipitate is formed which is usually dark and gummy and which settles or may be filtered off.

Dicarboxylic acids which are corrosion preventives include, for example, the following. In general they may be represented by the formula

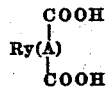

wherein A represents a carbon atom or a group of atoms comprising carbon which may be arranged in straight or branched chain, or cyclic, and may, if desired, contain one or more of the following elements: O, S, Se, Te, N; $y$ is an integer equal to or smaller than the positions in A which may carry alkyl radicals; and R represents hydrocarbon radicals (which may contain chlorine) at least one R being an aliphatic radical which may be paraffinic or olefinic.

Specific examples of this class are: alkyl malonic acids, e. g. cetyl malonic acid, stearyl malonic acid, oleyl malonic acid, octyl cetyl malonic acid, etc.; alkyl succinic acids such as are produced by condensing maleic acid anhydride with $C_{12}$ and higher mono olefins, hydrolyzing the reaction product, and, if desired, hydrogenating the hydrolyzed material to remove olefinic double bonds; alkylated glutaric, adipic, pimelic, suberic, azelic, sebacic, undecane dicarboxylic, etc., acids; dimerized oleic acid; di fatty acid ethers, sulfides, disulfides, selenides, tellurides and amines, wherein the ether, sulfide, etc., radical may form part of the bridge linking the carboxyl radicals, or may branch therefrom, such as dilauric acid sulfide, dimyristic acid sulfide, dipalmitic acid sulfide, distearic acid sulfide, alpha stearic ortho benzoic acid sulfide, succinic acid, mono and di-alkyl sulfides, corresponding ethers, disulfides, selenides, tellurides, amines, etc.

Different dicarboxylic acids call for different methods of manufacture, and depending on the specific method employed, various impurities other than metal salts may also be present, some of which are harmful, while others may be beneficial. For example, in the manufacture of alkyl or alkylene succinic acids involving the condensation of mono olefines with maleic acid anhydride (as described in U. S. patent, Moser, 2,133,734) a certain amount of purely organic by-product compounds (the composition of which is not definitely known) are formed which reduce the anti-corrosive powers of the main condensation product. Some of these undesirable organic by-products are also removed by the blowing treatment of this invention.

As indicated before, the blowing of the raw acids containing a metal impurity is carried out at a temperature above 100° C., and below dehydrating temperature of the acid. Dehydration results in the formation of acid anhydrides, and temperatures at which this occurs vary over a wide range, different acids having different dehydrating temperatures. With some acids, such as for example various alkyl succinic acids, dehydration may take place at temperatures as low as 120° C. Therefore, in any event, it is desirable to blow at temperatures below 150° C. and preferably between about 110° to 120° C.

The gas employed in the blowing should be substantially dry and must be inert to the acids at the temperature of the blowing. Nitrogen, hydrogen, carbon dioxide, flue gases, hydrocarbon gases, etc., may be employed.

The time of blowing is determined by the progress of the operation, blowing being continued until no further precipitation occurs. Several hours of blowing are usually required. Typical blowing time is 2 to 5 hours.

Any stable, substantially neutral solvent of sufficiently high boiling temperature may be employed. Suitable solvents are, for example, hydrocarbon oils such as gas oil, lubricating oil; monohydric alcohols of 10 or more carbon atoms such as decyl, lauryl, stearyl, etc., alcohols; ketones such as diamyl ketone, dicyclohexyl ketone, benzophenone, etc.; ethers, as diphenyl oxide, chlorinated diphenyl oxide, various poly ethylene glycol mono alkyl ethers, alkyl phenols, etc. The solvent should have a boiling temperature, or, in case of a mixture, an initial boiling temperature substantially higher than the blowing temperature, i. e. higher than about 150° C. and preferably higher than 180° or 200° C.

Since the dicarboxylic acids are most frequently employed in lubricating oils for corrosion inhibiting purposes, lubricating oils are preferred solvents for this purification. A purified concentrate of corrosion inhibitors in a lubricating oil is then obtained, which concentrate can directly be blended with further amounts of lubricating oils to produce an inhibited product ready for use.

The concentration of raw dicarboxylic acid in the solvent may vary between fairly wide limits, depending upon the solubility of the acid in the solvent. Suitable concentration may be between about .25 to 20%. In lubricating oils, concentrations between about 0.5 to 4% have been found to be particularly convenient. Lower concentrations may be employed, as will be explained later.

The amount of precipitate formed in the course of the blowing is usually quite small. Nevertheless the removal of these small amounts of impurities is very beneficial to the rust-protecting powers of the dicarboxylic acids. Amounts of iron as low as .006% were definitely found to be harmful.

It is not definitely known in what form the metal exists. Presumably it is a salt or complex compound of the metal with a lower, and probably more polar, acid or other intermediate contained at one time or other in the reacting mixture. Reasons for assuming that an acid of lower molecular weight than the corrosion inhibiting acids is involved in the formation of the harmful product are: The synthesis of the high molecular weight dicarboxylic acids always goes through some lower acids; and the presence of dispersed metals, or oxides of metals, does not reduce the anti-corrosive powers of purified dicarboxylic acids.

However, from a consideration of demulsibility and/or foaming of lubricating oils and other organic liquids containing the corrosion inhibitors, it is highly desirable that the inhibitor be free of any dispersed oil-insoluble metal compound. Thus lubricating oils should be free not only of metal compounds which may have formed during the manufacture of the dicarboxylic acids, but also of metal compounds which may have been introduced at a later date. The presence of dicarboxylic acids in lubricating oils tends to cause a fine dispersion of insoluble metal compounds, and by so doing increases the emulsification between the oil and water. By blowing with an inert gas as described, it is possible to coagulate various types of dispersed metal compounds, thereby eliminating them.

In line with the tendency of the dicarboxylic acids to disperse metal compounds, it has been observed that lubricating oils, flushing oils for various types of machinery, damping oils, antifreeze solutions, and other organic liquids containing corrosion inhibiting amounts of the dicarboxylic acids, i. e. amounts between about .001 and .25% or more tend to pick up metal oxides or hydroxides, such as rust, from metal surfaces with which they come in contact, and disperse them throughout the oil. Because of the extremely fine dispersion often resulting, it may be difficult to filter out the dispersed materials. In such a case, the blowing in accordance with this invention may be helpful, as it causes coagulation of the dispersoids so that they can be separated more easily, as by settling, filtration, etc., provided the organic liquid contains not more than a minor amount of water, i. e. is preferably more or less anhydrous, and has the required boiling temperature of at least about 150° C.

The following example illustrates this invention: A mixture of alkylene succinic acids was prepared by condensing mono olefines boiling above 280° C. with maleic acid anhydride by heating in an iron vessel. The resulting condensation product was hydrolyzed, and unreacted constituents were removed by steaming.

A portion of the resulting alkylene succinic acid was dissolved in a light grade turbine oil to produce a 3% solution. This solution was blown with nitrogen at a temperature between 113 to 118° C. for about 4 hours. A dark, gummy material precipitated, which was removed by filtering through cotton.

Separate .01% solutions in light turbine oil of the raw and refined alkylene dicarboxylic acids were then prepared and were tested by a modified Kuebler test, in which polished steel strips were subjected to the action of vigorously stirred emulsions of these solutions with 10% by volume of distilled water at 75° C.

The oil containing the untreated product allowed formation of a few rust spots, while the treated product gave perfect protection.

The steam emulsion numbers were as follows:

|  | Untreated product | Treated product |
|---|---|---|
| Steam emulsion No | 150 | 90 |

I claim as my invention:

1. In a method for purifying an aliphatic dicarboxylic acid of at least 16 carbon atoms having corrosion inhibiting power and containing dispersed a metal compound having adverse effect on this power, the steps comprising dissolving said acid in a stable, substantially neutral organic solvent having a boiling temperature above 150° C. to produce a solution containing about .25 to 20% of said acid, blowing said solution with an inert gas at a temperature above 100° C. and below the vaporization temperature of said acid to form a precipitate, and removing the latter from the remaining solution.

2. The method of claim 1, wherein the solvent has a boiling temperature above 180° C.

3. The method of claim 1, wherein the blowing temperature is between 110 and 120° C.

4. The method of claim 1, wherein the dicarboxylic acid is an alkyl succinic acid.

5. The method of claim 1, wherein said solution contains between about .5 and 4% of said acid.

6. In a method for purifying an aliphatic dicarboxylic acid of at least 16 carbon atoms having corrosion inhibiting powers and containing dispersed an impurity comprising a metal compound insoluble in mineral lubricating oils, the steps of dissolving said acid in a hydrocarbon oil having an initial boiling temperature above about 150° C. to produce a solution containing about .25 to 20% of said acid, blowing said solution with an inert gas at a temperature above 100° C. and below about 150° C. to form a precipitate, and removing the latter from the remaining solution.

7. In a method for purifying a dicarboxylic acid of at least 16 carbon atoms having corrosion inhibiting powers and containing dispersed an impurity comprising a metal salt introduced in the course of their manufacture, the steps of dissolving said acid in a stable, substantially neutral organic solvent having a boiling temperature above 150° C. to produce a solution containing about .25 to 20% of said acid, blowing said solution with an inert gas at a temperature above 100° C. and below the dehydrating temperature of said acid to form a precipitate, and removing the latter from the remaining solution.

8. In a method for purifying a dicarboxylic acid of at least 16 carbon atoms having corrosion inhibiting powers and containing dispersed an impurity comprising a metal salt introduced in the course of its manufacture, the step of dissolving said acid in a stable, substantially neutral solvent having a boiling temperature above about 150° C. to produce a solution containing about .25 to 20% of said acid, blowing said solution with an inert gas at a temperature between about 110° and 120° C. for 2 to 5 hours to form a precipitate, and removing the latter from the remaining solution.

9. In a method of improving the anti-corrosive properties of a lubricating oil containing at least a corrosion inhibiting amount of a dicarboxylic acid having at least 16 carbon atoms and containing dispersed a metal compound tending to reduce the anti-corrosive effect of this acid, the steps of blowing said oil with an inert gas at a temperature above 100° C. and below the dehydrating temperature of said acid, to coagulate dispersed impurities, and removing the resulting coagulated material from the oil.

10. In a method for removing dispersed metal compounds from a stable, substantially neutral organic solvent containing not more than a minor amount of water and at least a corrosion inhibiting amount of a dicarboxylic acid having at least 16 carbon atoms, said organic solvent having an initial boiling temperature above about 150° C., the steps of blowing said liquid with an inert gas at a temperature above 100° C. and below the dehydration temperature of said acid to coagulate said dispersed compounds, and separating the coagulated compounds from the remaining solution.

11. In a method for improving the corrosion inhibiting powers of a dicarboxylic acid selected from the group consisting of alkyl and alkylene succinic acids having at least 16 carbon atoms produced by a process involving condensation of maleic acid anhydride and mono olefines, the steps comprising dissolving said acid in a stable, substantially neutral organic solvent having a boiling temperature above 150° C. to produce a solution containing about .25 to 20% of said acid, blowing said solution with an inert gas at a temperature between 100° and 120° C. to form a precipitate, and removing the latter from the remaining solution.

12. In a method of improving the anti-corrosive properties of a lubricating oil containing a corrosion inhibiting amount of a dicarboxylic acid selected from the group consisting of alkyl and alkylene succinic acids having at least 16 carbon atoms, produced by a process involving condensation of maleic acid anhydride with mono olefines, the steps of blowing said oil with an inert gas at a temperature between 100 and 120° C. whereby a precipitate is formed, and removing the latter from the oil.

NORMAN B. WILSON.